June 18, 1935. D. B. PERRY Re. 19,614

TELEGRAPH COMMUNICATION SYSTEM

Original Filed June 21, 1930 3 Sheets-Sheet 1

INVENTOR
D. B. PERRY

BY G. E. Folk

ATTORNEY

June 18, 1935. D. B. PERRY Re. 19,614

TELEGRAPH COMMUNICATION SYSTEM

Original Filed June 21, 1930 3 Sheets-Sheet 2

INVENTOR
D. B. PERRY
BY
G. E. Folk
ATTORNEY

June 18, 1935. D. B. PERRY Re. 19,614

TELEGRAPH COMMUNICATION SYSTEM

Original Filed June 21, 1930 3 Sheets-Sheet 3

INVENTOR
D. B. PERRY
BY
G. E. Folk
ATTORNEY

Reissued June 18, 1935 Re. 19,614

UNITED STATES PATENT OFFICE 19,614

TELEGRAPH COMMUNICATION SYSTEM

Donald B. Perry, Maplewood, N. J., assignor to American Telephone and Telegraph Company, a corporation of New York Original No. 1,856,224, dated May 3, 1932, Serial No. 462,890, June 21, 1930. Application for reissue March 21, 1934, Serial No. 716,728

15 Claims. (Cl. 178—2)

This invention relates to printing telegraph switching system and more particularly to a system which has a central station capable of broadcasting to a plurality of other stations.

A primary object of this invention is to produce a telephone typewriter system whereby an instrument at one of several switchboards may send a message which will be received and recorded in typewritten form on a selected few or on all machines connected to the system.

Another object is to provide means for controlling the apparatus at all switchboards in the system from a remote central switchboard and for visually indicating to the operator at the central switchboard the proper functioning of the apparatus at each office.

A feature of this invention is a special circuit arrangement located at each office for conditioning the apparatus at that office to automatically rebroadcast messages to a group of stations.

A further feature is the use of circuit means whereby the central switchboard may obtain control of each local switchboard.

In general, the switching system to be described comprises a central switchboard connected to several distant local switchboards. Each of these, in turn, is connected through branch circuits with the various local receiving stations of which it forms the central point. Telegraph channels are utilized to connect the central switchboard with all the local switchboards. These channels may be used singly or simultaneously and over them it is possible to carry on two-way simultaneous (duplex) service.

A system of this type is especially adapted for use in police work and in business concerns where it is necessary to send information to many distant localities simultaneously and in a quick and efficient manner. The operator at the machine simply types the message on a keyboard similar to that of a standard typewriter and what is typed is automatically recorded on the receiving machines. In this manner a permanent record is made by both the transmitting and receiving machines.

Figure 1:
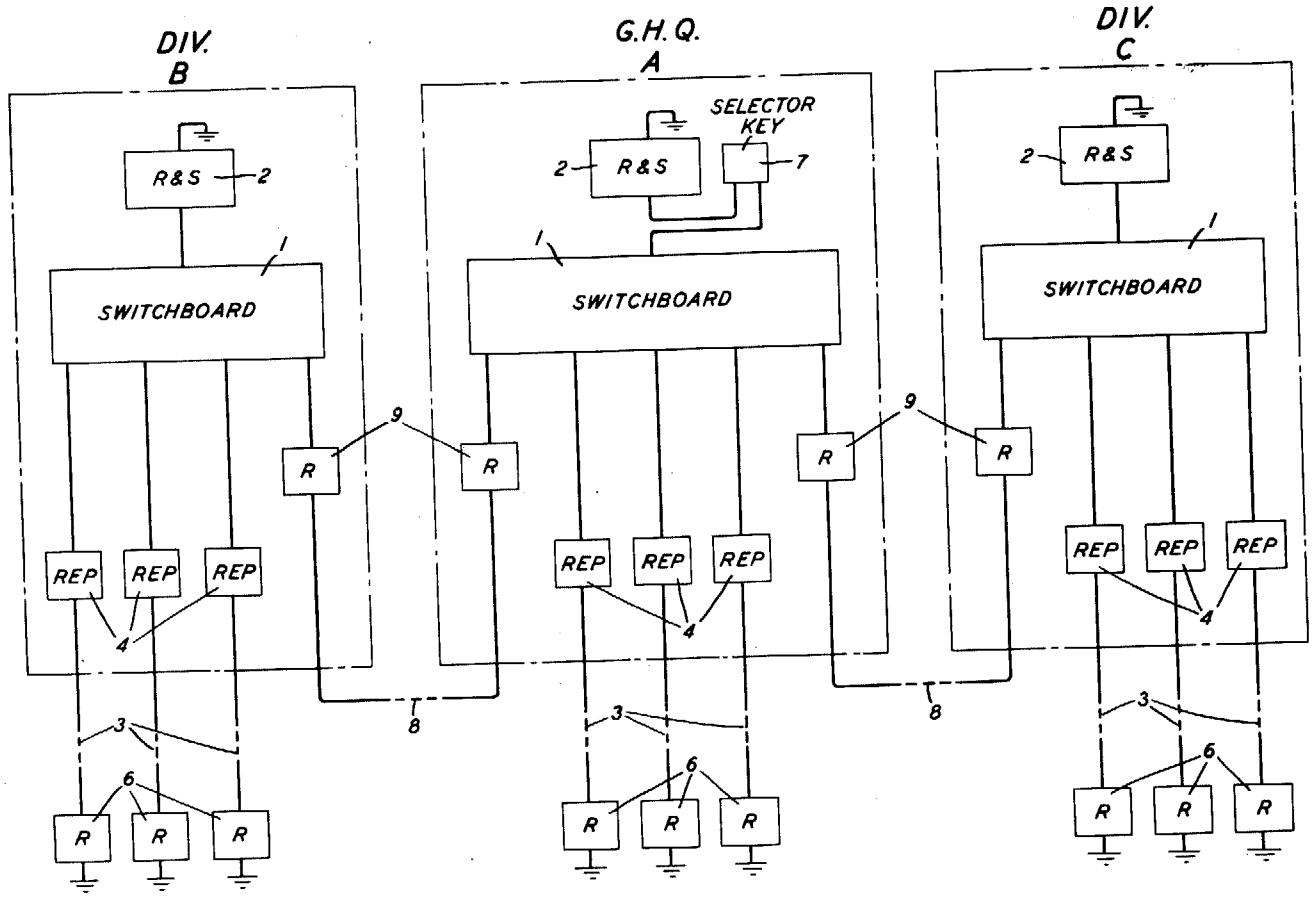
Figure 2:
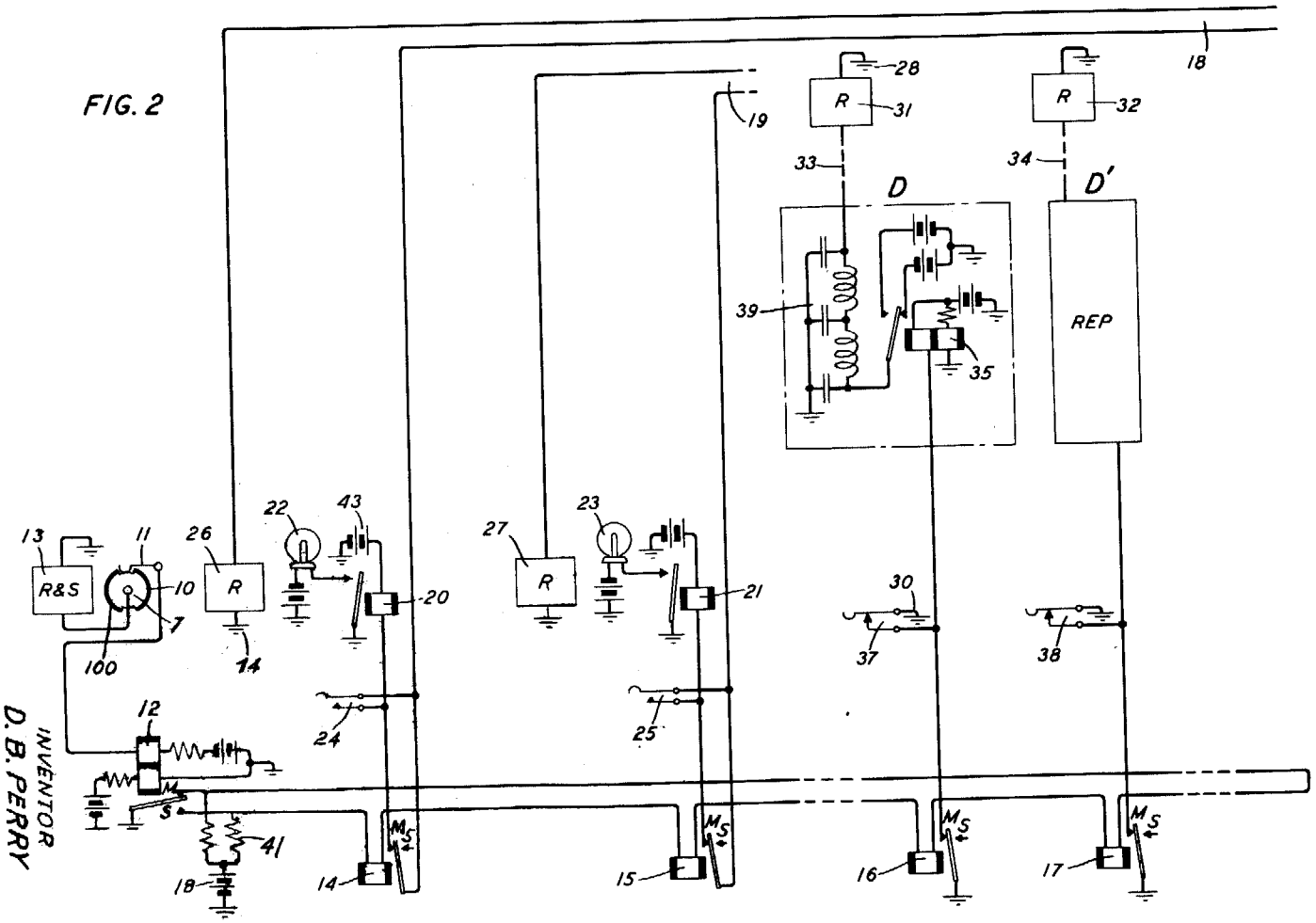
Figure 3:
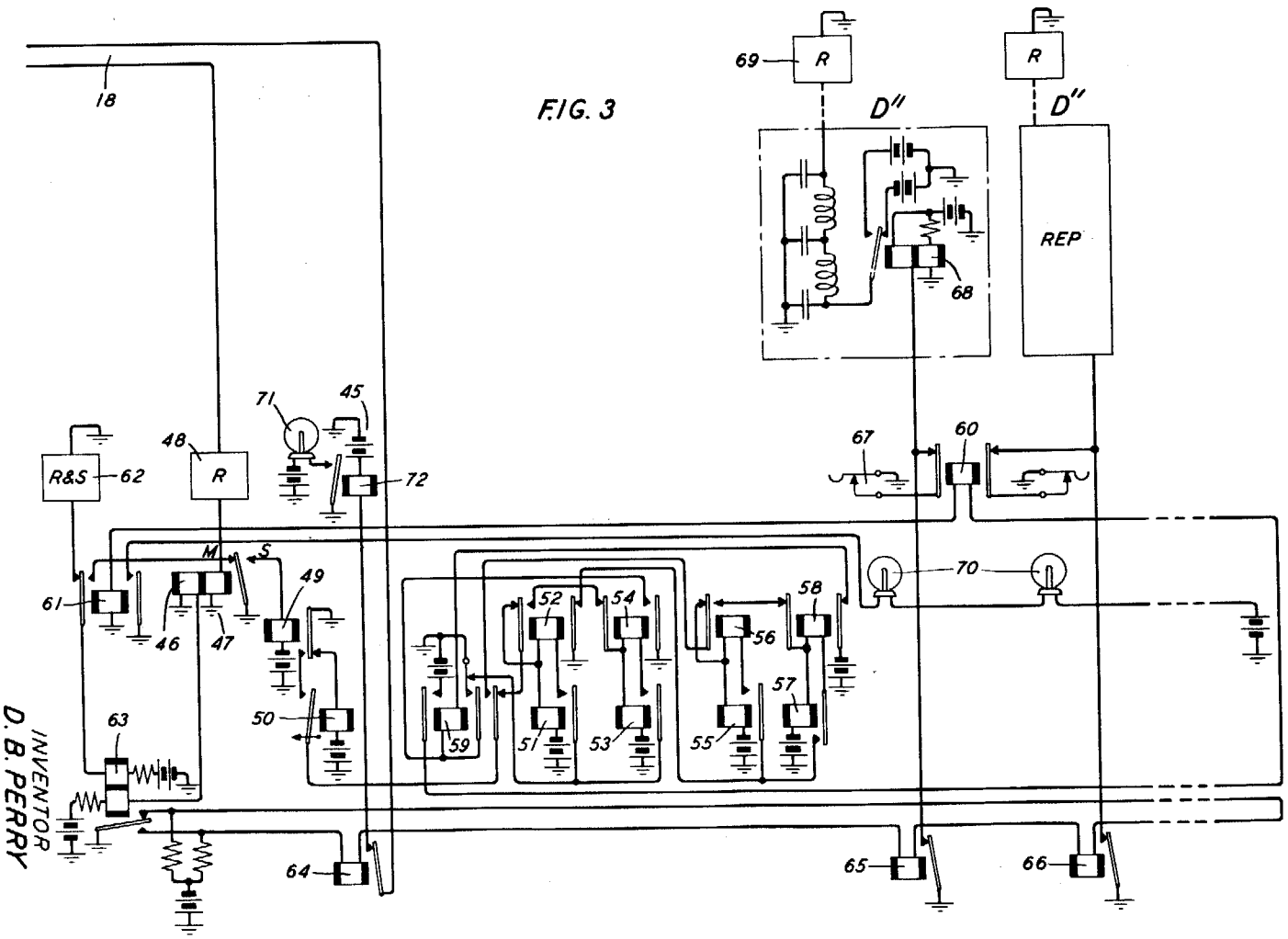

In the accompanying drawings Fig. 1 shows diagrammatically, the general arrangement of a radial printing telegraph system embodying the features of this invention;

Fig. 2 shows in detail the circuit diagram of the central switchboard or general headquarters of the system; and Fig. 3 shows in detail the circuit diagram of the local or division headquarters.

*General features of the system*

The principal function of Fig. 1 is to enable the reader to quickly comprehend the manner in which the various circuit diagrams, to be explained later, are connected with the system as a whole.

The telegraph system shown in Fig. 1 comprises a central or general headquarters station A and two division stations B and C. Each station is equipped with a switchboard 1 having normally associated therewith a printing telegraph transmitting and receiving set 2. From each station telegraph lines 3 extend to receiving only sets 6. A one-way polar repeating station 4 is provided for each telegraph line 3. Two-way telegraph channels 8 connect each division station with the central station A. These channels may be either full duplex or two one-way channels over which two-way simultaneous service may be carried on. At each station a receiving set 9, individual to each telegraph channel 8, is provided. Repeaters may be inserted in these channels if desired. The repeaters may be full duplex, one-way or any of the repeaters commonly used and well known in the telegraph art for two-way simultaneous communication.

The repeater 4 may be located at the switchboard or at a special repeater board located near the station.

At central station A, a special remote control code or selector key 7 is provided for transmitting a series of code impulses for conditioning the switchboard apparatus at each division station for automatically rebroadcasting messages received over the telegraph channels 8.

Although only two division stations are shown in Fig. 1, as many division stations may be provided as are considered desirable or necessary for a particular telegraph switching system. Several receiving sets 6 may be arranged in series with any particular telegraph line 3.

In general, the operation of selector key 7 at general headquarters will actuate the relay equipment at all the division headquarters to which the central station desires to broadcast. This relay equipment will retransmit the incoming signals to all the receiving sets connected to the switchboard of which it forms the central point. At the same time, general headquarters may broadcast the signals to the receiving sets connected to its own station if it is so desired. The switchboard at station A is so arranged that by means of keys it may transmit to a selected few or all division stations connected to the system. If general headquarters wishes to communicate with any or all division headquarters without broadcasting to the receiving stations associated with the respective division switchboards this may be done by transmitting from general headquarters without operating code selector key 7.

In addition, receiving sets 9 are provided at the central switchboard A and at the respective division switchboards for connection in each telegraph channel 8 associated with each division. In broadcasting from central station A, each of the sets 9 located at A is actuated by the proper functioning of the apparatus at the respective division station to which the set is connected by its respective telegraph channel 8. In this manner, headquarters is provided with a visual typewritten record of the message being broadcast and automatically retransmitted back over the telegraph channel 8 as an indication of the proper functioning of the apparatus at each office.

The detail operation of the system will now be explained in connection with Figs. 2 and 3.

*Broadcasting from general heaquarters*

Fig. 2 taken together with Fig. 3 and placed to the left of Fig. 3 shows a schematic circuit of the general headquarters' station equipment as well as that of the equipment at a division station. In connection with these figures, the circuit operation wil first be considered for broadcasting a message from general headquarters (Fig. 2) to one or more division stations (Fig. 3). Only two telegraph channels and two receiving stations are shown connected to the central switchboard.

Assuming that the operator at general headquarters desires to broadcast a message through the division headquarters to the receiving stations associated with the divisions, code selector key 7 will be operated. The operation of code key 7 through one revolution will transmit a series of special break and make signals by causing spring 11 of the key to make and break contact with insulated bushings 10 and 100 thus opening and closing the operating path for relay 12. Relay 12 is a special master relay with two windings and is normally held operated to its marking position on a circuit from battery through the upper winding of relay 12 to ground through the sending and receiving printer 13 and the contact of code key 7. Current through the lower or biasing winding tends to operate relay 12 against its spacing contact. The strength of the current flowing through the upper winding is greater than the biasing current and holds the armature of relay 12 to its marking contact. The transmission of an open or break signal from printer 13 or code key 7 will open the operating circuit through the upper winding and cause the armature of relay 12 to move to its spacing contact.

At this point, it will be noted that sending relays 14, 15, 16 and 17 have their operating windings connected in series in a circuit having one end connected to the spacing contact and the other end connected to the marking contact of the master relay 12, as shown. Resistances 40 and 41 connect the marking and spacing contacts, respectively, of relay 12 to battery 18. The armature of relay 12 is grounded.

As the armature of relay 12 operates, in accordance with signals transmitted from printer 13 or from code selector key 7, it causes the spacing and marking contacts of relay 12 to be grounded alternately. With the armature thereof on the spacing contact, current flows from battery 18 through resistance 40 through the windings of all the sending relays in series and thence to ground through the spacing contact and armature of relay 12. All the sending relays 14, 15, 16 and 17 are then operated against their respective spacing contacts. When the armature of relay 12 moves to its marking contact the direction of current flow through the windings of the sending relay is reversed, the current flowing now through resistance 41 and through the windings of the sending relays in series to ground through the marking contact and armature of relay 12. The sending relays are thus operated against their respective marking contacts. In this way, all the sending relays are caused to operate simultaneously, and to follow the signals transmitted from printer 13. Any number of sending relays may be inserted in the circuit, with their windings in series, to transmit signals to any desired number of division stations or branch receiving stations.

The operation of sending relay 14, in accordance with the signals transmitted by relay 12, will open and close a circuit traced from positive battery 43 through the winding of relay 20, contacts of relay 14, through one side of telegraph channel 18 to ground 47 through the receiving printer 48 and one winding of relay 46 at the division headquarters (Fig. 3), operating the receiving printer, causing the armature of relay 46 to follow the operation of relay 14 and releasing relay 20. The operation of relay 46 (Fig. 3) will actuate relay equipment at the division switchboard connected to channel 18 and will cause signals to be automatically transmitted back over the line 18 to operate receiving printer 26. This will be described in connection with Fig. 3. As mentioned previously, full duplex, one-way, or other types of repeaters may be inserted into the telegraph channel, if considered desirable.

Relay 20, in releasing, will light lamp 22 as an indication to the operator at the switchboard that signals are being sent to the division station connected to telegraph channel 18.

Key 24 is provided for short-circuiting the contacts of sending relay 14 to prevent the signals from being transmitted over channel 18. In this manner, the central switchboard may broadcast to a selected few of the division stations, or to all the divisions as desired.

It is to be noted that the operator at general headquarters, by watching the lamp indicators or the position of keys 24 and 25, can quickly observe which division stations are connected to receive the broadcast signals. The operation of the receiving set 26 is a visual indication to the central switchboard operator that the apparatus at the division station to which the set is connected is functioning properly.

Receiving set 26 is also used to receive signals which are initiated at the division switchboard. This will be described in connection with the transmission of signals from a division station.

Telegraph channel 19 connects another division switchboard to the central switchboard. Lamp indicator 23 and receiving set 27 associated with sending relay 15 and telegraph channel 19 are provided to function in a manner similar to that described for lamp indicator 22 and receiving set 26 associated with sending relay 14. Short-circuiting key 25 and relay 21 are connected in the circuit in a manner similar to that described for short-circuiting key 24 and relay 20 and serve a similar purpose.

For operating the branch receiving sets 31 and 32, which are local to the central switchboard, sending relays 16 and 17 and keys 37 and 38 are provided. One-way polar repeaters D and D' connect the central switchboard with the receiving sets through telegraph lines 33 and 34. The polar repeaters are well known in the telegraph art and their operation will be described in connection with the transmission of signals to the receiving stations.

To condition repeater D for transmitting, key 37 is operated. This will remove short-circuiting ground 30 from the marking contact of relay 16 and will permit the operation of relay 16, in accordance with the operation of master relay 12, to correspondingly operate relay 35, on a circuit from ground on the armature and contact of relay 16 to battery through the left winding of relay 35. Relay 35 has two windings, through one of which a biasing current flows. This biasing current normally tends to keep the armature against the left contact. The flow of current through the left winding operates relay 35 and causes its armature to move to the right. The alternate movement of the armature of relay 35 will transmit current first of one polarity and then of the other polarity to operate receiving set 31 over telegraph line 33. Filter 39 is a noise killer and serves to reduce undesirable interference in other telegraph and telephone wires.

In a similar manner, receiving set 32 will receive the transmitted message through one-way polar repeater D' (identical with D) upon the operation of key 38.

At this point, it will be noted that in cases where the receiving station is not at a great distance from the switchboard the one-way polar repeater may be eliminated. In such case and under certain conditions battery will be supplied at the contact of relay 16 instead of ground, and key 37 will be inserted in series with the telegraph line 33, with ground 30 removed from the circuit.

It will be noted that the operator at the central switchboard may transmit to one or all divisions, and to one or all the receiving sets connected to general headquarters by operating the proper keys. This is quite different from the operation of the division switchboard, which will now be described.

*Receiving broadcasting signals at division headquarters*

Returning to the condition previously described wherein sending relay 14 operated to its marking position, it will be recalled that the operation of relay 14 operated relay 46 to its marking position and also operated receiving printer 48 (Fig. 3). Normally the armature of relay 46 is held to its marking contact over a circuit traced from ground 47 (Fig. 3) through the right-hand winding of relay 46, receiving printer 48, telegraph channel 18, 18, marking contact of relay 14, winding of relay 20, to battery 43 (Fig. 2). It will be noted that a small amount of current flows through the left or biasing winding of relay 46. This current tends to move the armature of relay 46 to its spacing contact but is not of sufficient strength to overcome the current through the right or operating winding.

The operation of code key 7 will cause spring 11 to touch insulated bushing 10, in turn, releasing relay 12 and sending relays 14, 15, 16 and 17 to their respective spacing contacts. The release of relay 14 to its spacing contact, will open the operating path through the right-hand winding of relay 46 which, in turn, will move to its spacing contact. The movement of the armature of relay 46 to its spacing contact will complete a circuit to operate relay 49 on a path from ground on the armature and spacing contact of relay 46 to battery through the winding of relay 49. At this point, it will be noted that relay 50 is normally operated on a circuit from ground on the armature and break contact of relay 49 to battery through the winding of relay 50. Therefore, the operation of relay 49 will cause the release of relay 50. A circuit will now be completed to operate counting relay 51 on a path from ground on the armature of relay 49 through the contacts of relays 49, 50, 59 and 52 to battery through the winding of relay 51, operating relay 51. At this time spring 11 of code key 7 will have left the insulated bushing 10 and again made contact with the key to reoperate relay 12 and move the armature of relay 12 to the marking contact. This will operate sending relay 14 (Fig. 2) to its marking contact, in turn operating relay 46 to its marking contact. The operation of relay 46 will open the operating path for relay 49 which will release and cause the reoperation of relay 50. At this time counting relay 52 will operate and lock up on a path from battery through the windings of relays 51 and 52, in series, to ground through the contacts of relays 51 and 59. When spring 11 of code key 7 touches insulated bushing 100 to transmit another break signal, an open circuit will again occur over channel 18 which will again release relay 46 to its spacing contact. As mentioned before relay 49 will operate and relay 50 will release. A circuit will now be completed to operate counting relay 53 from ground on the armature of relay 49 through the contacts of relays 49, 50, 59, 52 and 54 to battery through the winding of relay 53 operating relay 53. Code key 7 will now return to normal and spring 11 will again make contact with the key, thus actuating master relay 12 to its marking contact and causing a closure of the circuit over channel 18. This last closure will cause the operation of relay 46 to its marking contact, the subsequent release of relay 49, and the reoperation of relay 50. Counting relay 54 will now operate on a circuit from battery through the windings of relays 53 and 54, in series, to ground through the contacts of relays 53 and 59. The operation of relay 54 will place ground on the winding of relay 59 causing it to operate on a circuit traced from ground on the make contact of relays 54 through the winding of relay 59 to battery on the break contact of relay 53. Relay 59 will now lock up on ground through its right make contact. The operation of relay 59 will remove ground from the windings of counting relays 51, 52, 53 and 54 which will release, the operation of relay 59 will also cause the operation of relays 60 and 61 on a circuit traced from battery on the left make contact of relay 59 to ground through the windings of relays 60 and 61 in series. The operation of relay 61 will disconnect sending and receiving printer 62 from the circuit and connect the armature of relay 46 to the upper winding of master relay 63. Master relay 63 operates to actuate individual sending relays 64, 65 and 66 in the same manner as heretofore described in connection with master relay 12 of Fig. 2. The operation of relay 60 will remove the short-circuiting ground on key 67 from the contact of relay 65 and will permit relay 68 to follow the operations of sending relay 65. The operation of the polar repeater set D'' from the sending relay is similar to that herein described in connection with the operation of polar repeater D of Fig. 2. Incidentally, it will be noted that the operation of relay 61 placed a ground on lamp indicator 70 as an indication to the operator at the division station that general headquarters has taken control of the station for broadcasting.

Broadcasting from the central switchboard may now take place.

Receiving set 48 at the division switchboard will record the messages received from the central board. Relay 46 will follow all signals, in turn, operating relay 49 and master relay 63. Relay 63 will automatically retransmit all incoming signals to the sending relays 64, 65 and 66. Relay 50 is designed to be slow in releasing and will not follow the message signals actuating relay 49. Relay 64 will operate in response to the operation of relay 63 and will open and close a circuit traced from battery 45 through the winding of relay 72, contact of relay 64, telegraph channel 18, receiving printer 26 to ground 14. Receiving set 26 will respond to these signals. In this manner the central board will receive the retransmitted message from the division stations while broadcasting to the latter.

Relay 72 will light lamp 71, in accordance with the signals retransmitted by sending relay 64, in a manner hereinbefore described in connection with relay 20 and lamp 22 in Fig. 2.

It will be apparent that there may be many more sending relays in series with relays 65 and 66 and, also, more line relays in series, with line relay 60, if the number of receiving stations desired warrant the addition.

It is to be noted that the central switchboard may seize control of the circuit at any time and disconnect sending and receiving printer 62 from the master relay 63. Also, for broadcasting from the central switchboard to receiving sets local to the division switchboard, key 67, individual to each local branch receiving set, need not be thrown. The operation of relay 60 serves the purpose of conditioning the one-way polar repeater for transmitting signals to the branch receiving sets.

After broadcasting a message, general headquarters may send a disconnect signal to restore the circuit to normal by again operating code key 7 for one revolution.

The first break signal transmitted, as spring 11 touches bushing 10, will release relay 46 to its spacing contact. The release of relay 46 will operate relay 49, in turn, causing the release of relay 50. Counting relay 55 will then operate from a circuit traced from battery through the winding of relay 55 to ground through the break contact of counting relay 56 and make contacts of relays 59, 50 and 49. When spring 11 leaves bushing 10 and again makes contact on key 7, relay 46 will operate, in turn, releasing relay 49. The release of relay 49 will cause the operation of relay 50. Counting relay 56 will now operate and lock up on a circuit from battery through the windings of relays 55 and 56, in series, to ground through make contact of counting relay 55, and break contact and armature of counting relay 52. The next break signal transmitted as spring 11 reaches bushing 100 will release relay 46, in turn operating relay 49 and causing the release of relay 50, in a manner similar to that previously described.

Counting relay 57 will now operate from battery through its winding to ground over the break contact of counting relay 58, make contact of counting relay 56, make contact of relay 59, break contact of relay 50, make contact and armature of relay 49. When spring 11 returns to its normal position after leaving insulated bushing 100, relay 46 will operate, in turn releasing relay 49 and operating relay 50. Counting relay 58 will now operate and lock up from battery through the windings of counting relays 57 and 58, in series, to ground through the make contact of relay 57 and break contact of relay 52. The operation of counting relay 58 will open the operating path for relay 59 by removing battery from the winding of relay 59. Relay 59 will therefore release, in turn, releasing relays 60 and 61. The release of relay 61 will connect sending and receiving printer 62 to the upper winding of relay 63 thus restoring the circuit to normal. It will be noted that counting relays 55, 56, 57 and 58 will remain locked up until general headquarters broadcasts again. When this occurs, the operation of counting relay 52 will remove ground from the locking up circuit and relays 55, 56, 57 and 58 will fall down.

It is to be noted at this point, that if general headquarters desires to communicate with the division headquarters without broadcasting to the branch receiving stations associated with each division, code selector key 7 will not be operated. The operation of printer 13 (Fig. 2) will cause the operation of receiving only set 48 (Fig. 3). The division station may answer by operating printer 62 (Fig. 3) which, in turn, will cause the operation of relays 63, 64 and receiving set 26.

*Sending from division switchboard*

If the division station desires to transmit to its own local branch receiving stations, sending printer 62 is utilized. Relay 63 will be under the control of printer 62 and will function to actuate sending relays 64, 65 and 66 in the same manner as that described in connection with receiving signals from general headquarters.

The operation of relay 64 will transmit the message back over telegraph channel 18 by operating receiving printer 26 at the central switchboard.

In order to transmit to the local receiving station 69, key 67 must be manually operated. The operation of key 67, removes ground on the swinger of the key from the left winding of relay 68 and permits the latter to follow the operations of 65. The operation of relay 68, in accordance with the operation of sending relay 65, causes the signals to be retransmitted to receiving set 69. It is to be understood that the circuit description for transmitting to receiving set 69 applies as well to the operation of all other receiving sets connected to the division switchboard.

Although only one sending and receiving printer is shown at the central and division switchboards, it is understood, of course, that other sending and receiving printers may be provided for use when a printer set becomes disabled.

What is claimed is:

1. A printing telegraph system of the type used for broadcasting messages from a central station to a plurality of remote stations, said remote stations in turn rebroadcasting the messages to a plurality of branch stations local to each remote station characterized in this, that the remote stations are normally not in condition to rebroadcast messages received by them and that a special circuit arrangement is utilized at the remote stations for conditioning apparatus at said stations for automatically rebroadcasting, said circuit arrangement being responsive to code signals from said central station.

2. A switchboard for transmitting signals to a plurality of stations comprising a relay, counting relay means responsive to signals from said relay and circuit means responsive to the operation of said counting relay means for conditioning the switchboard for transmitting signals to a plurality of branch stations.

3. A printing telegraph system comprising a switchboard, a plurality of local switchboards, a plurality of branch receiving stations for each switchboard, a plurality of telegraph lines connecting the branch receiving stations with each switchboard, a telegraph channel individual to each local switchboard for connecting the local switchboard with the central switchboard, circuit means at each local switchboard responsive to a code signal broadcast from the central switchboard for retransmitting message signals simultaneously to the branch stations.

4. A printing telegraph system in accordance with claim 3, characterized in this, that means are provided at each local switchboard for automatically transmitting back to the central switchboard over the telegraph channel individual to each respective local board, the message signals received from said central switchboard.

5. A printing telegraph system comprising a central switchboard, a local switchboard connected to said central switchboard, branch receiving stations associated with said local board, circuit means at said local board, said circuit means being responsive to a code signal from said central switchboard for conditioning said local switchboard to retransmit automatically to said branch receiving stations the message signals received from said central switchboard.

6. A radial switching system comprising a central switchboard, a local switchboard, a plurality of outlying branch stations connected to the local switchboard, a telegraph channel connecting said central board with said local board, a telegraph printer at said local switchboard for transmitting messages from the local switchboard to the branch stations connected thereto, circuit means in said local board responsive to signals from said central board for seizing control of said local switchboard from said telegraph printer for broadcasting messages from said central switchboard.

7. A printing telegraph system comprising a switchboard, another switchboard connected thereto, receiving sets associated with said second switchboard, relay means and circuit means at said second board, said relay means being responsive to signals from said first board for conditioning said circuit means to retransmit to the receiving sets the message signals received from said first board.

8. In a printing telegraph system having a central station, a plurality of remote stations, branch stations connected to said remote stations, means at said central station for transmitting signals to any or all of said remote stations, said remote stations being normally not in condition to rebroadcast messages transmitted from said central station, transmitting mechanism at each of the remote stations for transmitting signals to said branch station, circuit means at each of the remote stations under the control of the operator at the central station for disconnecting the transmitting mechanism thereat, in combination with a visual indicator controlled by the disconnection of the transmitting mechanism for indicating to the operator thereat that his transmitter is disconnected.

9. In a printing telegraph system having a central station, a plurality of remote stations, branch stations connected to said remote stations, said remote stations being normally not in condition to rebroadcast messages transmitted from said central station, transmitting mechanism at each of the remote stations, circuit means at the remote stations under the control of the operator at the central station for disconnecting the transmitting mechanism thereat, in combination with an indicating device at the control station controlled by the rebroadcasting of signals from a remote station to indicate that the remote station is rebroadcasting.

10. A telegraph system comprising a first signaling station having signal transmitting means and a second signaling station having signal responsive means operable by signals transmitted from the first station, signal transmitting means, and means operable by said signal responsive means for retransmitting to said first signaling station the signals as received therefrom, the signal transmitting means at the first station being entirely free from control of the second station.

11. A telegraph signaling station comprising signal responsive means, means operable by said signal responsive means for retransmitting received signals, signal transmitting means operable independently of said retransmitting means, and means for rendering inoperative said signal retransmitting means.

12. A telegraph signaling station comprising signal responsive means, signal transmitting contacts, other contacts operable by said signal responsive means for retransmitting received signals and switch means for disconnecting the circuit of said other contacts.

13. A telegraph signaling station comprising signal responsive means, signal transmitting means operable by said signal responsive means for retransmitting received signals, other signal transmitting means operable independently of said signal retransmitting means, and means for rendering inoperative either of said signal transmitting means.

14. A telegraph signaling station connected to a communication line comprising signal responsive means, signal transmitting contacts operable by said signal responsive means for retransmitting signals received thereby, and other transmitting contacts operable independently of said signal responsive means, and switch means for connecting either of said transmitting contacts to said line and for disconnecting said other transmitting contacts from said line.

15. A telegraph station comprising signal responsive means, signal retransmitting means operable by said signal responsive means, additional signal transmitting means operable independently of said signal retransmitting means, and switch means controlled by said signal responsive means for rendering inoperative either of said signal transmitting means.

DONALD B. PERRY.